(No Model.)
J. H. & D. MELTZER & J. J. BAKER.
STRAW STACKER.
No. 282,210. Patented July 31, 1883.
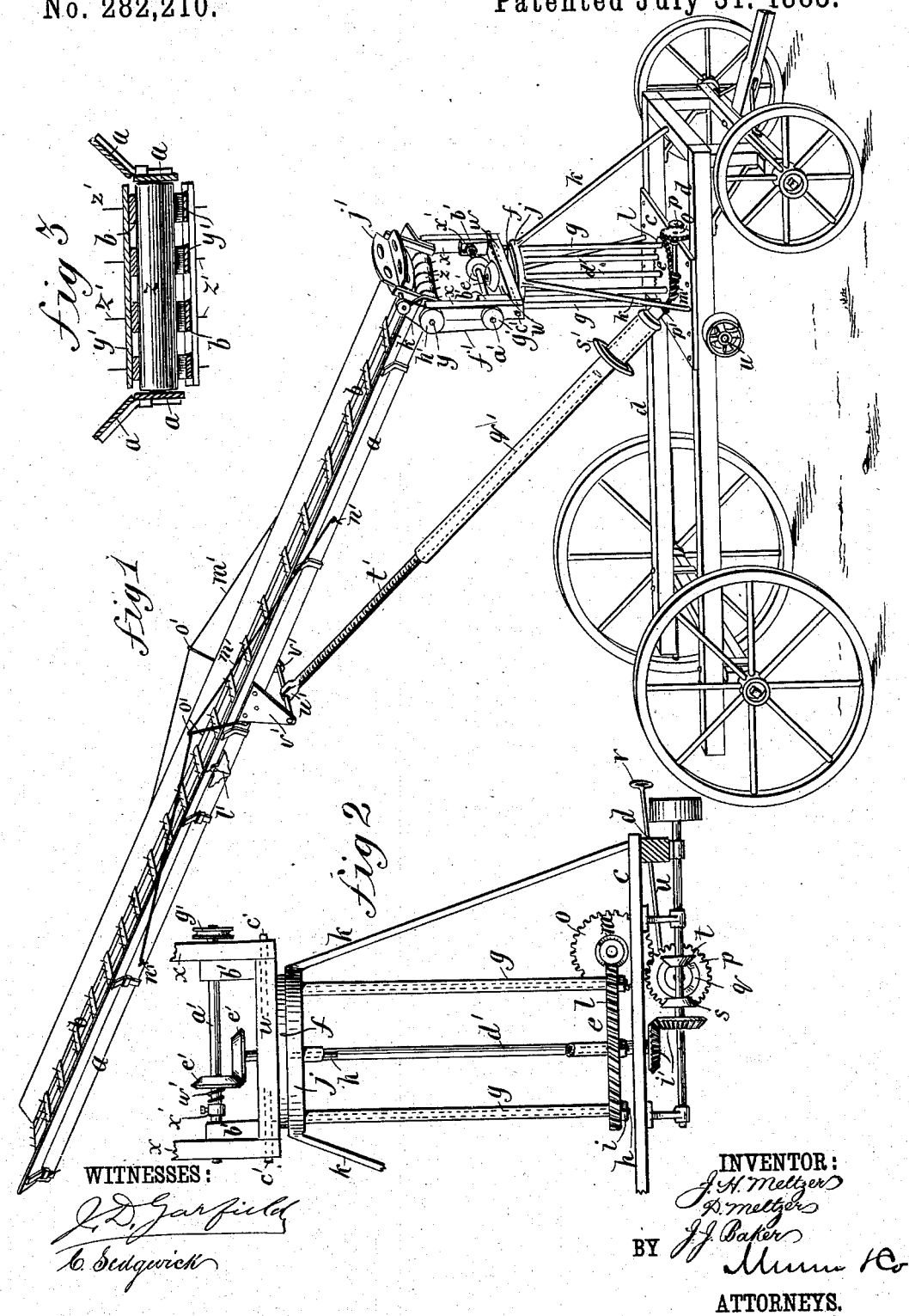

United States Patent Office.

JOHN H. MELTZER, DAVID MELTZER, AND JOHN J. BAKER, OF METZER, ASSIGNORS, BY DIRECT AND MESNE ASSIGNMENTS, OF ONE-HALF TO JAMES W. TREES, CYRUS E. TREES, AND ETHAN A. TREES, OF RUSH COUNTY, IND.

STRAW-STACKER.

SPECIFICATION forming part of Letters Patent No. 282,210, dated July 31, 1883.

Application filed December 9, 1882. (No model.)

*To all whom it may concern:*

Be it known that we, JOHN H. MELTZER, DAVID MELTZER, and JOHN J. BAKER, of Metzer, in the county of Shelby and State of Indiana, have invented a new and Improved Straw-Stacker, of which the following is a full, clear, and exact description.

Reference is to be had to the accompanying drawings, forming part of this specification, in which similar letters of reference indicate corresponding parts in all the figures.

Figure 1 is a perspective view of our improved straw-stacker. Fig. 2 is a side elevation of the supporting-stand of the base of the carrier on a larger scale than in Fig. 1, and Fig. 3 is a transverse section of the carrier.

For the support of the lower end of the frame or trough $a$ of the endless carrier or elevator $b$, we set up a stand on the cross bar or plate $c$ of the wagon-bed $d$, said stand consisting of a reel composed of lower head, $e$, upper head, $f$, tubular reel bars or supports $g$, and connecting-rods $h$, with binding-nuts $i$, the lower head resting by any suitable step on the plate $c$, and the upper one being secured in a supporting-collar, $j$, permanently fixed on braces $k$, the said reel being capable of turning in its supports, and being geared by a toothed rim, $l$, of the lower head, $e$, with a worm, $m$, which gears by the wheels $o$ and $p$ with a shaft having bevel friction-wheel $q$, located between the bevel friction-wheels $s$ and $t$ on the driving-shaft $u$, and mounted on a sliding box having a shifting-lever, $v$, so that it can be alternately geared with said wheels $s$ and $t$, for turning the reel to right or left, according as it is desired to swing the carrier $b$ forward and backward over the stack, the said carrier being mounted on the top of the reel-standard by means of the inverted channel-bar $w$, uprights $x$, and the shaft $y$, passing through the upper ends of said uprights $x$ and the lower ends of the bars $a$ of the carrier-trough, and also being the shaft of roller $z$, around which the endless carrier-belts $b$ run. The uprights $x$ pivot on a shaft, $a'$, mounted in bearings $b'$, attached to the top of channel-bar $w$, and they are secured in the upright position by rods or keys $c'$, passing through their lower ends and along the groove of the channel-bar, said key-rods $c'$ being removable to allow the carrier-trough $a$ to swing down on shaft $a'$, below the top of the reel, when it is desired to take down and arrange the stacker on the wagon for transportation. The shaft $a'$ also gears with a vertical shaft, $d'$, by friction-wheels $e'$, to drive the endless carrier $b$ by the belt $f'$ and pulleys $g'$ and $h'$, said shaft $d'$ being located in the axis of the reel-stand, and extending through the base-plate $c$, where it gears with driving-shaft $u$ by wheels $i'$. The shaft $u$ is to be driven by a belt from any suitable shaft of the thrashing-machine separator.

At the lower end of the carrier, and where the straw is delivered upon it from the separator, we locate a beater-fan, $j'$, the object of which is to force the straw and chaff upward and onto the carrier, and thus prevent the escape of a portion of the same that would otherwise fall back. This fan is driven by a belt, $k'$, from the pulley $h'$. The trough $a$ is divided into two sections, which are hinged together at $l'$, so that the upper section may fold over onto the lower one when taken down, and the joint is supported by the tension-rods $m'$, hooked to the sections at $n'$, and stretched over the struts $o'$.

For lifting up and supporting the carrier we employ an extension-brace underneath the carrier, and having a foot-rest on the lower head, $e$, of the supporting-reel, said foot-rest being jointed thereto at $p'$, and said extension-brace consisting of a tube, $q'$, internally screw-threaded, and fitted to be turned by a hand-wheel, $s'$, and a screw-threaded rod, $t'$, fitted in said tube, and connected to the trough by the rod $u'$ and arms $v'$, said arms being adapted to rest on the truck-frame $d$ at the rear end when the carrier is let down thereon, and being so that they will slide along said frame forward and backward by working the extension-brace, to allow of the lengthwise motion of the carrier requisite for enabling the trough to swing down and up again on the shaft $a'$.

Instead of screw-threading the tube $q'$ its whole length, a nut may be fitted in the upper end, and, if desired, a couple of telescopic tubes may be employed with a screw-threaded rod fitted to work in them, the rod being connected at the lower end and below tube $q'$ to hand-wheel $s'$ for turning it, and the upper tube being connected to rod $u'$ and sliding out and in tube $q'$. We do not, however, limit ourselves to the particular construction of the extension-brace, as any approved form of the same will serve our purpose. It must, however, be jointed to the head $e$ at the lower end and to the carrier frame or trough.

The bevel friction-wheels $e'$ are brought into engagement by a spring, $w'$, and adjustable collar $x'$, by which the pressure may be gaged to the required amount of friction for enabling them to slip for the protection of the carrier $b$, in case it clogs with straw or other obstruction that would break it in case it was positively geared.

The cross-slats $y'$ of the carrier are to be armed with pins $z'$ for teeth, to hold the straw better when the wind blows.

We also propose to arrange suitable guards, consisting of wire fingers, around the base of the carrier and the upper end of the separator, (not shown,) to prevent the wind from blowing the straw away when it falls from the separator upon the lower end of the carrier.

Having thus described our invention, what we claim as new, and desire to secure by Letters Patent, is—

1. The supporting-standard consisting of heads $ef$, suitable connecting-rods, a supporting-step at the bottom, and a supporting-collar at the top, in combination with the endless carrier and extension-brace mounted on it, as and for the purpose described.

2. The combination of the carrier-frame $a$, the supporting-standard, bar $w$, uprights $x$, shaft $a'$, and the shaft $y$, said uprights being on the shaft $a'$, substantially as and for the purpose specified.

3. The combination of the uprights $x$, the endless carrier-frame, the supporting-standard, shaft $a'$, channel-bar $w$, and key-rod $c'$, as and for the purpose specified.

4. The combination of the carrier $ab$, the supporting-standard, pivoted uprights $x$, shafts $a'$, and the extension supporting-brace, as and for the purpose specified.

5. The endless carrier $a\ b$, having arms $v'$, in combination with the extension-brace, the supporting-standard, and the truck-frame $d$, said carrier being pivotally connected to the supporting-standard, substantially as described.

6. The combination of the reversing-gear $q$ $t\ s$, driving-gears $p$, $o$, $m$, and $l$, with the driving-shaft $u$, the lower head, $e$, of the supporting-standard, and the endless carrier, substantially as described.

7. The combination of the beater-fan $j'$ with the endless carrier $a\ b$, substantially as described.

JOHN HENRY MELTZER.
DAVID MELTZER.
JOHN J. BAKER.

Witnesses:
WILLIAM E. HIGGINS,
JOHN H. KUHN.